(12) United States Patent
Haramburu et al.

(10) Patent No.: US 8,226,029 B2
(45) Date of Patent: Jul. 24, 2012

(54) ENGINE MOUNTING STRUCTURE FOR AIRCRAFT WITH A REAR ENGINE ATTACHMENT BEAM FORMING A SPREADER BEAM

(75) Inventors: Eric Haramburu, Toulouse (FR); Laurent Sammito, Toulouse (FR); Jean Larrochelle, Toulouse (FR)

(73) Assignee: Airbus Operations (Societe par Actions Simplifiee), Toulouse (FR)

( * ) Notice: Subject to any disclaimer, the term of this patent is extended or adjusted under 35 U.S.C. 154(b) by 423 days.

(21) Appl. No.: 12/663,430

(22) PCT Filed: Jun. 19, 2008

(86) PCT No.: PCT/EP2008/057768
§ 371 (c)(1),
(2), (4) Date: Dec. 7, 2009

(87) PCT Pub. No.: WO2008/155376
PCT Pub. Date: Dec. 24, 2008

(65) Prior Publication Data
US 2010/0170980 A1 Jul. 8, 2010

(30) Foreign Application Priority Data
Jun. 20, 2007 (FR) .................................... 07 55887

(51) Int. Cl.
*B64D 27/00* (2006.01)
(52) U.S. Cl. .......................................... 244/54; 248/554
(58) Field of Classification Search .................... 244/54; 248/554, 555, 556, 557
See application file for complete search history.

(56) References Cited

U.S. PATENT DOCUMENTS

| 5,320,307 | A | 6/1994 | Spofford et al. | |
| 2001/0025902 | A1 | 10/2001 | Jule et al. | |
| 2003/0025033 | A1* | 2/2003 | Levert et al. | 244/54 |
| 2004/0251380 | A1* | 12/2004 | Pasquer et al. | 244/54 |
| 2007/0069068 | A1* | 3/2007 | Lafont et al. | 244/54 |
| 2007/0069069 | A1* | 3/2007 | Diochon et al. | 244/54 |
| 2008/0169377 | A1* | 7/2008 | Levert | 244/54 |
| 2008/0169378 | A1 | 7/2008 | Beaufort et al. | |

FOREIGN PATENT DOCUMENTS

| EP | 0 564 126 | 10/1993 |
| EP | 1 136 355 | 9/2001 |
| WO | 2006 097484 | 9/2006 |

OTHER PUBLICATIONS

U.S. Appl. No. 12/668,030, filed Jan. 7, 2010, Haramburu, et al.

* cited by examiner

*Primary Examiner* — Joshua J Michener
*Assistant Examiner* — Medhat Badawi
(74) *Attorney, Agent, or Firm* — Oblon, Spivak, McClelland, Maier & Neustadt, L.L.P.

(57) ABSTRACT

An engine mounting structure for an engine aircraft including a rigid structure forming a caisson, together with an engine mounting system mounted on the structure, and a rear engine attachment, including an attachment strut to which is connected at least one shackle, to be connected to the engine. The engine mounting system includes a system for transmitting thrust efforts generated by the engine, including two lateral connecting rods connected to a spreader beam mounted in articulated fashion relative to the caisson. The attachment strut constitutes the spreader beam, wherein the body is mounted in articulated fashion relative to the caisson using an articulated shaft system.

8 Claims, 7 Drawing Sheets

ENGINE MOUNTING STRUCTURE FOR AIRCRAFT WITH A REAR ENGINE ATTACHMENT BEAM FORMING A SPREADER BEAM

DISCLOSURE

1. Technical Field

The present invention relates generally to an engine unit for an aircraft, of the type comprising an engine, an engine mounting structure, and an engine mounting system with multiple engine attachments, which is interposed between a rigid structure of the engine mounting structure and the engine.

The invention also relates to such an aircraft engine mounting structure.

The invention may be used in any type of aircraft fitted, for example, with jet engines or turboprop engines.

This type of engine mounting structure, also called an "EMS", allows, for example, a turboshaft engine to be suspended beneath the wing surface of the aircraft, or indeed allows this turboshaft engine to be mounted above this same wing surface.

2. State of the Prior Art

Such an engine mounting structure is, indeed, designed to constitute the linking interface between an engine such as a jet engine and a wing surface of the aircraft. It enables the efforts generated by its jet engine to be transmitted to the structure of this aircraft, and also allows conveyance of the fuel, and passage of the electrical, hydraulic and air systems, between the engine and the aircraft.

In order to ensure the transmission of the efforts, the structure comprises firstly a rigid part, also called the primary structure, and often of the "caisson" type, i.e. formed by the assembly of upper and lower stringers and of two lateral panels connected one to the other by means of transverse ribs.

Secondly, the structure is fitted with an engine mounting system interposed between the jet engine and the rigid part of the structure; this system comprises, overall, at least two engine attachments, generally one forward attachment and one rear attachment.

In addition, the mounting system comprises a system for transmission of the thrust efforts generated by the jet engine. In the prior art, this device takes, for example, the form of two lateral connecting rods connected on the one hand to a rear part of the fan casing of the jet engine, and also to a spreader beam, which is itself connected to a rear engine attachment strut attached to the caisson.

Similarly, the engine mounting structure also comprises a second mounting system interposed between the rigid part of this structure and the wing surface of the aircraft, where this second system is habitually comprised of two or three attachments.

Finally, the structure has a secondary structure providing segregation between, and maintenance of, the systems, whilst supporting aerodynamic fairings.

In the embodiments of the prior art, the engine mounting system comprises a rear engine attachment the body of which is, as mentioned above, attached directly to the lower stringer of the caisson, with which it is habitually in contact. The attachment strut, which is also called the transverse beam, also supports the spreader beam in articulated fashion; at its ends the spreader beam receives the connecting rods transmitting the thrust efforts, as this is known from documents EP 1 136 355 and U.S. Pat. No. 6,494,403.

This configuration implies various disadvantages including, in particular, the complexity of the design of the rear part of the engine mounting system, which causes substantial, and therefore costly, assembly and disassembly times. In addition, this configuration leads to a high degree of encumbrance, constituting a substantial obstacle in the outflow area of the secondary flow, and therefore causes non-negligible aerodynamic disturbances. The aerodynamic disturbances found at right angles to the axis of the rear engine attachment cause a drag, leading to loss of performance of the aircraft.

Finally, it should be noted that another disadvantage of this type of embodiment, in which the spreader beam is joined to the rear engine attachment beam, which is itself attached on to the lowest stringer of the primary structure, lies in the combination of several separate force pathways in the same rear engine attachment, making its design quite complicated.

SUMMARY OF THE INVENTION

The purpose of the invention is therefore to provide an engine mounting structure for an aircraft at least partially providing a solution to the disadvantages mentioned above, compared with the embodiments of the prior art.

To accomplish this, the object of the invention is an engine mounting structure for an engine aircraft, where the said structure comprises a rigid structure forming a caisson, together with an engine mounting system mounted on the said rigid structure, and notably comprising a rear engine attachment, comprising an attachment strut to which is connected at least one shackle, also intended to be connected to the engine, where the said engine mounting system also comprises a system for transmitting the thrust efforts generated by the engine, comprising two lateral connecting rods connected at their rear end to a spreader beam mounted in articulated fashion relative to the said caisson. According to the invention, the said attachment strut of the rear engine attachment constitutes the said spreader beam on to which the said two lateral connecting rods are connected, where the said attachment strut is mounted in articulated fashion relative to the said caisson using an articulated shaft system.

The specific feature of the invention therefore lies in the fact that the body of the rear engine attachment is mounted in articulated fashion relative to the rigid structure forming the caisson such that it simultaneously forms the spreader beam of the device for transmitting the thrust efforts incorporating the lateral connecting rods.

Through this dual function of the attachment strut, a notable simplification of the design of the rear part of the engine mounting system is obtained, and a lesser encumbrance. The times for assembling and disassembling the engine on the structure are consequently reduced, and the aerodynamic disturbances of the secondary flow are minimised.

The said attachment strut is, preferably, mounted in articulated fashion on to a support bracket mounted in fixed fashion on to the said caisson, where the said support bracket incorporates a slug belonging to the said articulated shaft system, housed in a corresponding orifice of the said attachment strut. It is, naturally, also possible to design a reverse construction, in which the slug is supported by the attachment strut and the corresponding orifice is made in the support bracket, without going beyond the scope of the invention. Similarly, another conceivable solution would be to have the articulated shaft system traversing each of the attachment struts and support bracket.

In the preferred case, in which the articulated shaft system, and therefore in particular the abovementioned slug, is aligned in a vertical direction, the cooperation between this slug and the corresponding orifice enables the efforts being exerted in the lengthwise and transverse directions to be transmitted.

The engine mounting structure preferably also comprises a brace system enabling the said attachment strut to be retained relative to the support bracket in the direction of a hinge line of the spreader beam defined by the said articulated shaft system, in which the said brace system traverses each of the said attachment struts and support bracket, and also the said slug forming a hollow slug. Thus, this brace system enables the rear engine attachment to be completed, transmitting the efforts being exerted in the vertical direction, when it is aligned in this same direction.

The said attachment strut preferably has two reception devices, cooperating respectively with the two lateral connecting rods, where the said reception devices are positioned, as seen from the front, either side of the articulated shaft system, in the known aim of obtaining an equal distribution of the efforts transiting through the thrust efforts transmission connecting rods. In such a configuration, the said two reception devices are designed such that each takes the form of a cap, manufactured in a single piece with the said attachment strut.

Also preferably, the engine mounting structure comprises stop devices mounted on the rigid structure forming the caisson and positioned such that they can stop, in both directions, the rotation of the spreader beam around its hinge line defined by the said shaft system.

Thus, in the event of a failure in this transmission device, which might, for example, take the form of a broken connecting rod or of a shaft linking one of these connecting rods and the spreader beam, the rotation of the latter, constituted by the rear engine attachment strut, can be stopped by the stop devices intended for this purpose. When such a situation occurs, the thrust efforts are then advantageously transmitted by one of the two connecting rods only, in combination with the stop or stops between the spreader beam and the judiciously positioned stop devices.

The said support bracket preferably comprises two lateral projections housed with some play respectively in two slots made in the said attachment strut, the said slots and projections jointly forming the said stop devices. Alternatively, it might be envisaged to contain the projections on the spreader beam and the corresponding slots on the support bracket, without going beyond the scope of the invention.

More generally, it is provided that the stop devices should comprise lateral projections fixed to the primary structure and respectively cooperating with lateral slots made in the attachment strut, or vice versa.

Alternatively, the lateral projections can be supported by the shaft system and cooperate respectively with lateral slots made in the attachment strut, or vice versa.

Finally, they can alternatively comprise at least one stop element which, firstly, traverses the attachment strut, being fixed to the latter, and also traverses the articulated shaft system with some play, where the said stop element is able to swivel freely with the attachment strut in the spreader beam axis, until it has consumed the play between this same stop element and said articulated shaft system, which then enables the rotation of the attachment strut to be blocked if a failure occurs. Conversely, the said at least one stop element could be fixed to the shaft system, and be mounted with some play through the attachment strut, for which it could then form a stop if too substantial a swivelling of this body occurred, revealing a failure.

Preferably, as mentioned above, the said articulated shaft system is positioned roughly vertically, and therefore roughly parallel to the transverse plane of the beam-shaped rear engine attachment strut.

Finally, the said caisson is designed such that it is formed by the assembly of an upper stringer, a lower stringer, two lateral panels and transverse ribs linking the said stringers and panels, in which the said rear engine attachment strut forming the spreader beam is located under the said lower stringer. This applies in the preferred case, in which the engine is intended to be suspended under the wing surface of the aircraft.

The object of the invention is also an engine unit for aircraft comprising a structure such as the one which has just been presented, together with an engine attached on to this structure.

Finally, its object is an aircraft comprising at least one such engine unit.

Other advantages and characteristics of the invention will appear in the non-restrictive detailed disclosure below.

BRIEF DESCRIPTION OF THE DRAWINGS

This description will be made with reference to the attached illustrations, among which.

DETAILED DESCRIPTION OF PREFERRED EMBODIMENTS

Figure 1:
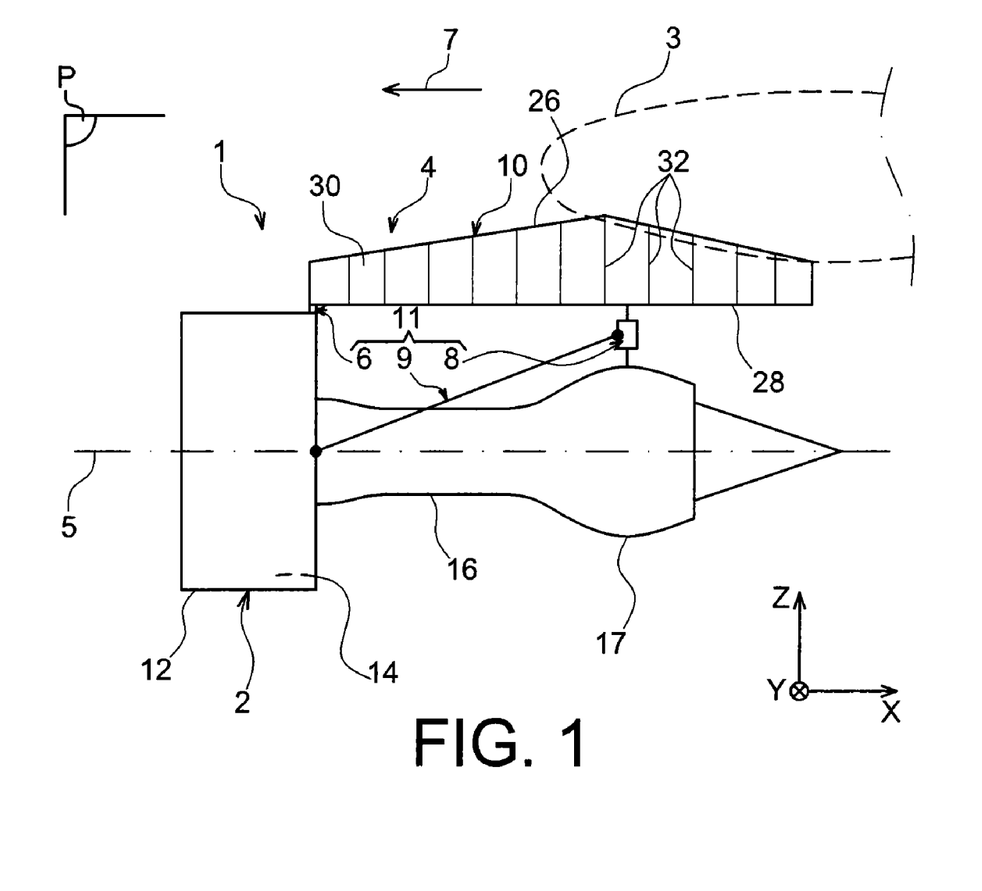
FIG. 1 represents a partially schematic side view of an engine unit for aircraft, comprising an engine mounting structure according to a preferred embodiment of the present invention.

With reference to FIG. 1, it shows an engine unit 1 for aircraft intended to be attached under a wing 3 of this aircraft, where this unit 1 forming the subject of the present invention is fitted with an engine mounting structure 4 taking the form of a preferred embodiment of the present invention.

Overall, engine unit 1 comprises an engine such as a jet engine 2 and engine mounting structure 4, where the latter is notably fitted with a rigid structure 10 and an engine mounting system 11 comprising multiple engine attachments 6, 8, and a system for transmission of thrust efforts 9 generated by jet engine 2, where mounting system 11 is therefore interposed between the engine and the abovementioned rigid structure 10; the latter is also called the primary structure. As an indication, it should be noted that unit 1 is intended to be surrounded by a nacelle (not represented), and that engine mounting structure 4 comprises another series of attachments (not represented) enabling this unit 1 to be suspended under the wing surface of the aircraft.

Throughout the disclosure, by convention, X refers to the longitudinal direction of structure 4 which is also comparable to the longitudinal direction of jet engine 2, this direction X being parallel to a longitudinal axis 5 of this jet engine 2. Further, Y refers to the direction which is transverse to structure 4 and also comparable to the transverse direction of jet engine 2, and Z to the vertical direction or the height; these three directions X, Y and Z are mutually orthogonal.

In addition, the terms "forward" and "rear" must be considered relative to the forward direction of the aircraft imparted due to the thrust exerted by jet engine 2, and this direction is represented schematically by arrow 7.

In FIG. 1 it can be seen that only transmission system 9, engine attachments 6, 8, and rigid structure 10 of engine mounting structure 4 have been represented. The other unrepresented constituent elements of this structure 4, such as the means for mounting rigid structure 10 under the wing surface of the aircraft, and the secondary structure providing segregation and maintenance of the systems whilst supporting aerodynamic fairings, are traditional elements identical or similar to those found in the prior art, and known to the skilled man in the art. Consequently, no detailed disclosure will be made of them.

Jet engine 2 has at the front a large fan casing 12 demarcating an annular bypass duct 14, and comprises towards the rear a smaller central casing 16, enclosing the core of this jet engine. Finally, central casing 16 is extended to the rear by an ejection casing 17 which is larger than that of casing 16. Casings 12, 16 and 17 are naturally fixed one to another.

As can be seen in FIG. 1, system 11 is constituted by forward engine attachment 6, a rear engine attachment 8, and an attachment 9 forming a device for transmitting the thrust efforts generated by jet engine 2. As is shown schematically in FIG. 1, this system 9 takes the form of two lateral connecting rods (only one is visible due to it being a side view) connected firstly to a rear part of fan casing 12, and secondly to a spreader beam mounted in articulated fashion relative to caisson 10, as will be described in detail below.

Forward engine attachment 6 is secured to fan casing 12, and is for example designed so as to be able to transmit efforts generated by jet engine 2 in the Y and Z directions, using shackles/small connecting rods. As an indication, this forward attachment 6 preferably penetrates into a circumferential end part of fan casing 12.

Rear engine attachment 8 constitutes a feature of the invention and will be described in greater detail with reference to the following figures. It is, overall, interposed between ejection casing 17 and rigid structure 10 of the engine mounting structure. For its part, it is designed so as to be able to transmit efforts generated by jet engine 2 in direction Z, and also those exerted in the X and Y directions, due to its particular cooperation with transmission system 9, which will be described below.

Again with reference to FIG. 1, it can be seen that structure 10 has the form of a caisson extending in direction X; this caisson is also called the torsion box. It is traditionally formed by an upper stringer 26 and a lower stringer 28, and also by two lateral panels 30 (a single one is visible in FIG. 1), both extending in direction X and roughly in an XZ plane. Within this caisson, transverse ribs 32 positioned in the YZ planes and spaced longitudinal reinforce the rigidity of the caisson. It should be noted as an indication that elements 26, 28 and 30 can each be constructed as a single piece, or alternatively through the assembly of jointed sections, which can possibly be slightly inclined relative to one another. In this case lower stringer 28 extends preferably in a plane which is inclined relative to horizontal, along its entire length, as shown in FIG. 1. The inclination is such that lower stringer 28, parallel to direction Y, approaches axis 5 to the rear, with the aim of approaching ejection casing 17 in order to enable rear engine attachment 8 to be positioned on this same casing 17. All the elements forming the caisson are preferably made from composite materials comprising a blend of resin and glass and/or carbon fibers.

Figure 2:
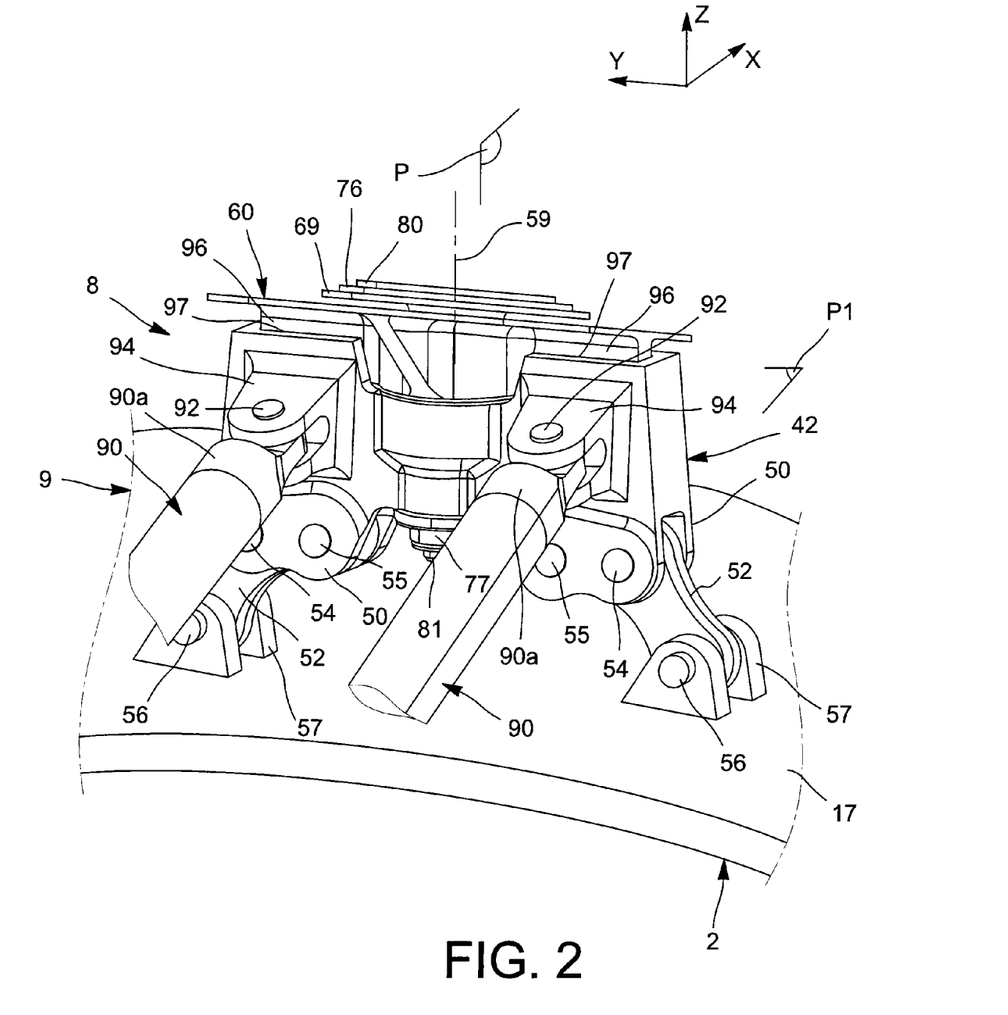
FIG. 2 represents a partial detailed perspective view of the rear part of the engine mounting system, belonging to the structure shown in FIG. 1.
Figure 3:
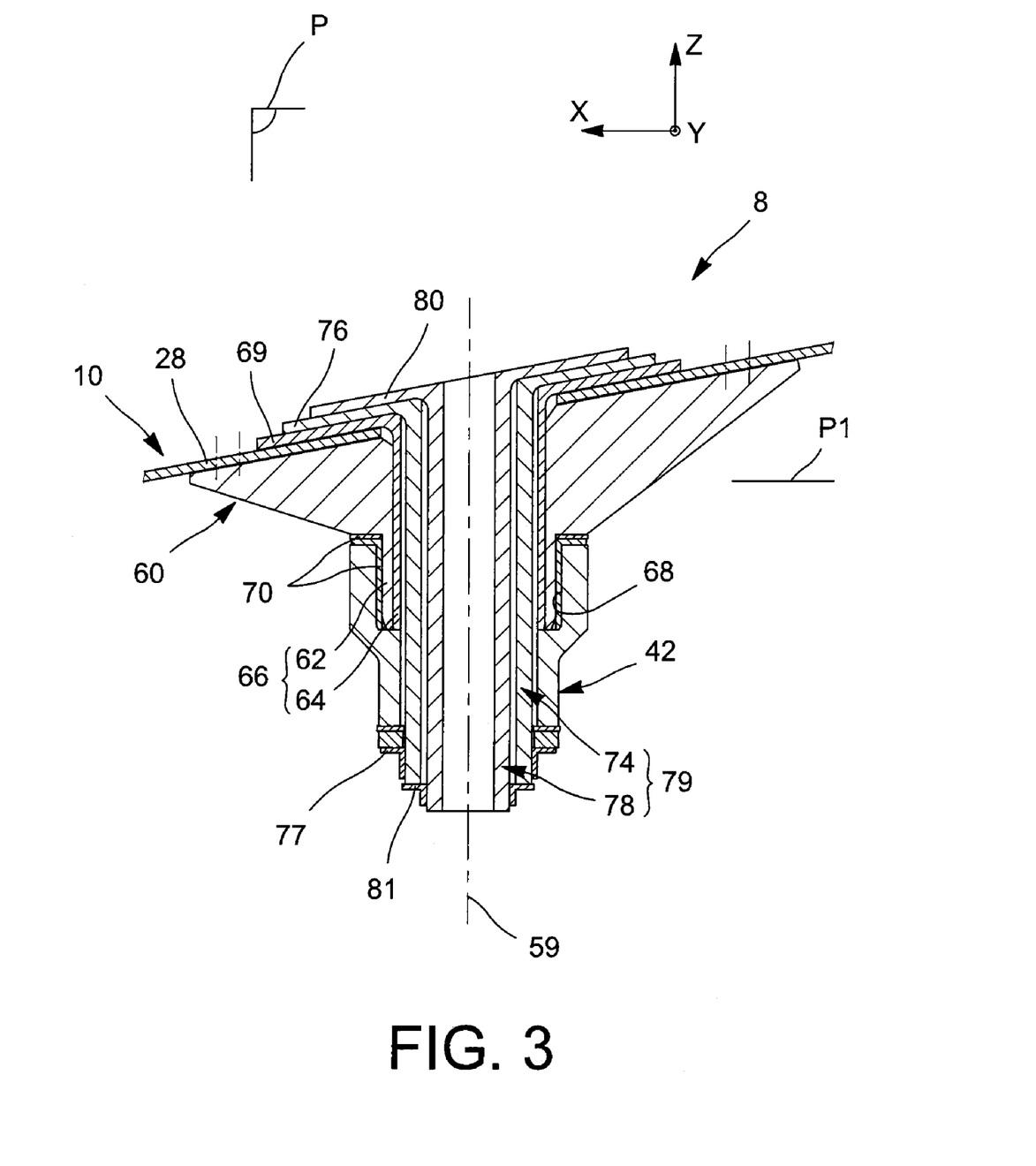
FIG. 3 represents a longitudinal section view passing through symmetry plane P of FIG. 2.
Figure 4:
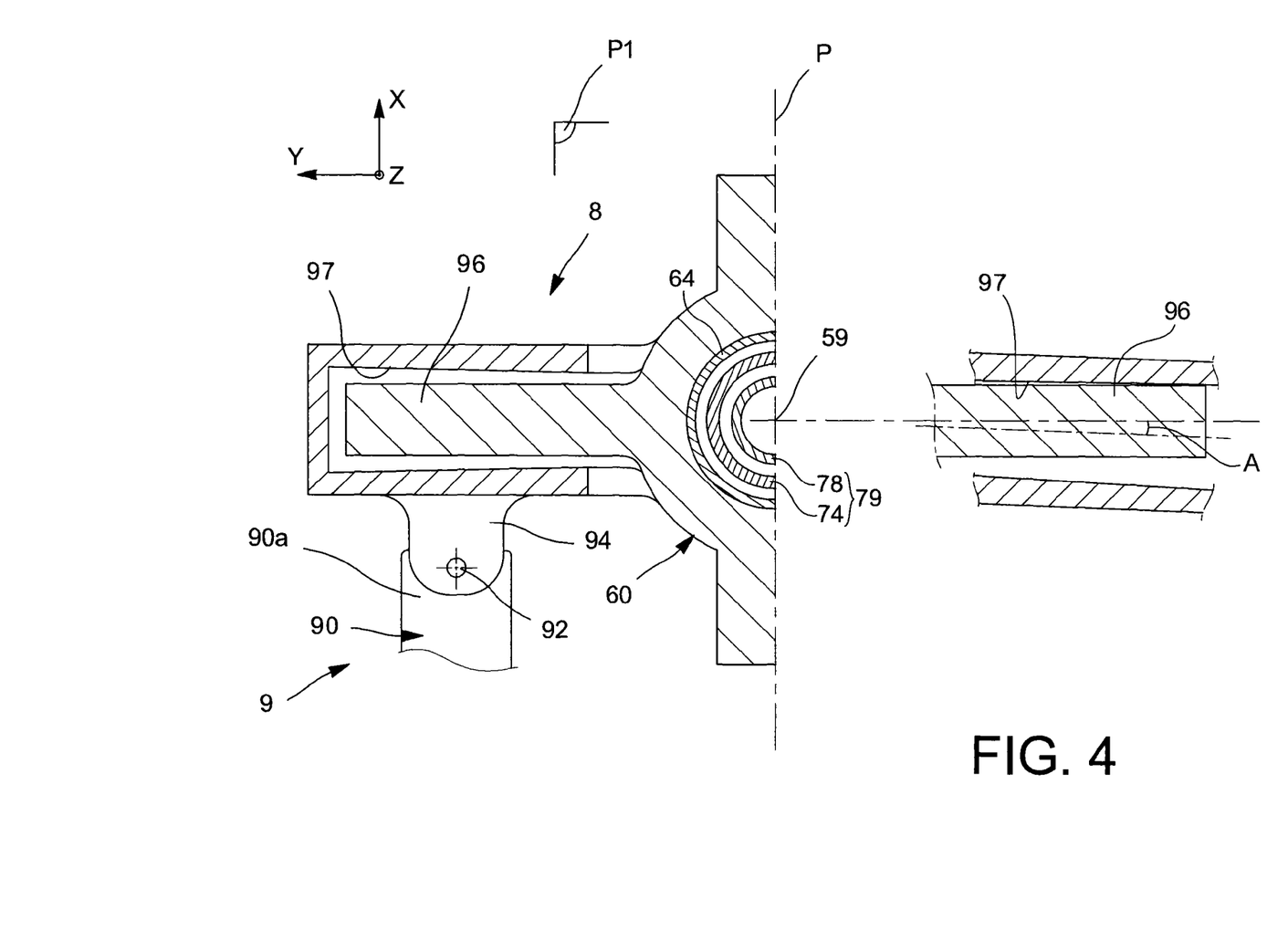
FIG. 4 represents a section view passing through horizontal plane P1 of FIGS. 2 and 3, where the left-hand half-section shows the normal "non-degraded" configuration, and where the right-hand half-section shows the "degraded" configuration, adopted following the breakage of one of the thrust effort transmission lateral connecting rods.

With reference to FIGS. 2 to 4, a part of rear engine attachment 8 and of the system for transmitting thrust efforts 9 can be seen, certain elements of which have been deliberately omitted, for obvious reasons of clarity.

Rear engine attachment 8 comprises a body comparable to a transverse beam manufactured as a single piece, and mounted on caisson 10 in a manner specific to the present invention, which will be described in detail below. Like the whole of rigid structure 10, this body 42 positioned under lower stringer 28 has plane P, oriented in the X and Z directions, as the symmetry plane.

In the area of the opposite lateral ends, body 42 comprises a cap 50 on to which is connected a shackle 52 through a shaft 54 oriented in direction X. As an indication, there is also a second shaft 55 oriented in the direction X between these two elements, but mounted with some play so as to be operative only in the event of failure/rupture of the link formed using shaft 54. This enables a safety function called a "Fail Safe" to be provided for the transmission of efforts in direction Z.

In addition, there is another shaft 56 oriented in direction X in the area of a lower end of shackle 52, so as to connect the latter to a bracket/cap 57 mounted in fixed fashion on to casing 17 of jet engine 2.

One of the features of the present invention consists in mounting attachment strut 42 in articulated fashion relative to caisson 10, aligned with a hinge line 59 passing through symmetry plane P. To accomplish this, there is firstly a support bracket flattened in the area of its flat upper surface against lower stringer 28, externally relative to caisson 10. The bottom of bracket 60, which is mounted in fixed fashion conventionally on lower stringer 28, ends with a hollow slug 62 aligned with axis 59. It forms, with an additional hollow slug 64 which is preferably concentric and positioned internally relative to the latter, an articulated shaft system 66 of attachment strut 42 on caisson 10. As is most visible in FIG. 3, the upper end of additional hollow slug 64 takes the form of a shoulder 69 supported by the inner side of stringer 28, where the body of this additional slug indeed traverses this same stringer 28, and support bracket 60.

Shaft system 66 aligned with vertical axis is housed in a corresponding orifice 68 made in attachment strut 42, and opening towards the top. As an indication, it should be noted that in order to facilitate the oscillatory rotary movements of attachment strut 42 around shaft system 66, elements referenced 70, with a low friction coefficient, are interposed between the contact surfaces.

The cooperation between orifice 68 and hollow slug 62 of shaft system 66 enables the efforts exerted in directions X and Y to be transmitted. In addition, additional slug 64 enables the efforts exerted in these same directions to be transmitted in the event of failure/fracture of slug 62. This advantageously enables a safety function called a "Fail Safe" to be provided for the transmission of efforts in the X and Z directions. In addition, it should be noted that in order for this force pathway passing through hollow slug 64 to be operative only on occurrence of a failure/fracture of slug 62, there is preferably some functional play between the two concentric slugs 62, 64.

As mentioned above, articulated shaft system 66 therefore consists of an external shaft 62 cooperating closely with the said central orifice 68, and an internal shaft 64 called the "standby", which is installed with some play inside external shaft 62. This provides a redundancy of the force pathway transmitted by articulated shaft system 66, and consequently provides the "Fail Safe" safety function, as this has just been presented. Nevertheless, it would alternatively be possible, without going beyond the scope of the invention, to have a solution in which the articulated shaft system would consist of two symmetrical adjoining half-shafts providing a redundancy of the force pathway, given that in the event of a failure occurring in one of the half-shafts the efforts are then transmitted by the other non-failing half-shaft. Secondly, another possible design would be to have the articulated shaft system fixed to the rear engine attachment beam, and the corresponding central orifice on the primary structure.

To maintain attachment strut 42 in direction Z relative to the caisson and to support bracket 60 attached on to the latter, there is a brace 74 internally traversing additional hollow slug 64, and attachment strut 42. It consequently also traverses support bracket 60 and orifice 68, as can be seen in FIG. 3. To maintain verticality, brace 74 has, in the area of its upper end, a shoulder 76 supported against the abovementioned shoulder 69 and, in the area of its lower end forming a downward projection relative to body 42, a threaded part cooperating with a nut 77 flattened against this same body 42. Thus, nut 77 is tightened until a very small play is obtained between the end of articulated shaft system 66 and the bottom of the corresponding shaft 68 and/or between the upper end of body 42 and support bracket 60.

Brace 74 forms with an adjoining brace 78 a brace system 79 aligned with vertical axis 59, where brace 78 is preferably positioned concentrically and internally relative to brace 74. Brace 78 has, in the area of its upper end, a shoulder 80 supported against the abovementioned shoulder 76 and, in the area of its lower end forming a downward projection relative to brace 74, a threaded part bearing a nut 81 cooperating with the lower end of brace 74.

As can be seen in FIG. 3, hollow and concentric elements 64, 74 and 78 traverse lower stringer 28, implying that their shoulders 69, 76 and 80 are located inside the caisson, and superimposed, being in two-by-two contact.

The presence of brace 74 enables the efforts being exerted in direction Z to be transmitted. In addition, additional brace 78 enables the efforts exerted in this same direction to be transmitted in the event of failure/fracture of brace 74. This advantageously enables a safety function called a "Fail Safe" to be provided for the transmission of efforts in this Z direction. In addition, it should be noted that in order for this force pathway passing through brace to be operative only on occurrence of a failure/fracture of brace 74, there is preferably functional play between nut 81 and the lower end of brace 74.

Thus, there is a brace system 79 which is housed inside articulated shaft system 66, and which overall enables engine attachment strut 42 to be kept in direction Z. Like articulated shaft system 66, brace system 79 consists of two braces able to work jointly or independently, in order to guarantee the redundancy of the force pathway. In a first solution, corresponding to the one represented in FIG. 3, the two braces 74 and 78 can be bracketed and work jointly. Alternatively, it would be possible to design it such that only external brace 74 is working, with adjoining brace 78 "on standby" inside external brace 74, i.e. by having a play between nut 81 and the lower end of external brace 74. Secondly, it is specified that a reverse construction could be adopted, in which the brace system is fixed to the rear engine attachment beam, without going beyond the scope of the invention.

Moreover, it is indicated that the transmission of the moments exerted in directions X and Y is effected using articulated shaft system 66, through its bending stress.

The connection of rear engine attachment strut 42 relative to caisson 10 is specifically designed such that this body simultaneously fulfils the role of spreader beam of the thrust efforts transmission device, as this will now be described in detail, again with reference to FIGS. 2 to 4.

Device 9 comprises globally two lateral connecting rods for transmission of thrust efforts 90, where each of these connecting rods has a forward end (not represented in these figures) connected to fan casing 12, for example on or near a horizontal median plane of jet engine 2.

The two lateral connecting rods 90, positioned either side of plane P, each has a rear end 90a connected to a spreader beam formed by body 42, which is therefore connected in a vertical axis 59 passing through plane P.

A mechanical link, constituting the link by which the thrust efforts are intended to transit in normal mode, is made using an articulated shaft 92 linking rear end 90a with reception devices taking the form of a cap 94 made from a single piece with body 42.

The two shafts 92 are preferably orthogonal relative to the plane of the connecting rods 90, and positioned, as seen from the front, either side of articulated shaft system 66 and its axis 59.

With reference more specifically to FIG. 4, it is possible to see that structure 4 comprises stop devices which are judiciously positioned such that in the event that transmission device 9 fails, which can take the form, for example, of a fracture of one of the connecting rods 90 or a fracture of one of the shafts 92, the rotation of the spreader beam 42 is stopped by these stops.

In the described preferred embodiment, the stop devices take the form of two fittings positioned symmetrically relative to plane P, where each fitting has a lateral projection 96 forming an integral part of bracket 60, housed with some play in a vertical slot 97 made in attachment strut 42 forming the spreader beam, and opening at the top.

Thus, in normal operation, projection 96, which extends vertically and laterally, does not normally stop against the walls of slot 97 in which it remains inserted, as is visible on the left-hand half-view in FIG. 4.

Conversely, when a failure of the type indicated above occurs, spreader beam 42 which is then connected only by a single connecting rod 90, swivels in axis 59 until one of its lateral ends comes into contact with its corresponding projection 96, forming stop devices. More specifically, and as shown in the right-hand half-view of FIG. 4, it is one of the vertical walls of slot 97 which stops against its corresponding projection 96.

Consequently, it must be understood that the positioning of the stops is chosen such that a maximum angle A of rotation of this spreader beam around axis 59 is imposed; this maximum angle A, which is preferably identical for both directions of rotation, is naturally determined such that the thrust efforts transmission function can always be provided by transmission device 9, at least during a determined period.

Lastly, it is indicated that the abovementioned stop devices can also be used, when they are in a stop configuration, for transmission of the moments being exerted in directions X and Y, jointly using articulated shaft system 66 which is subjected to bending stress.

Figure 5:
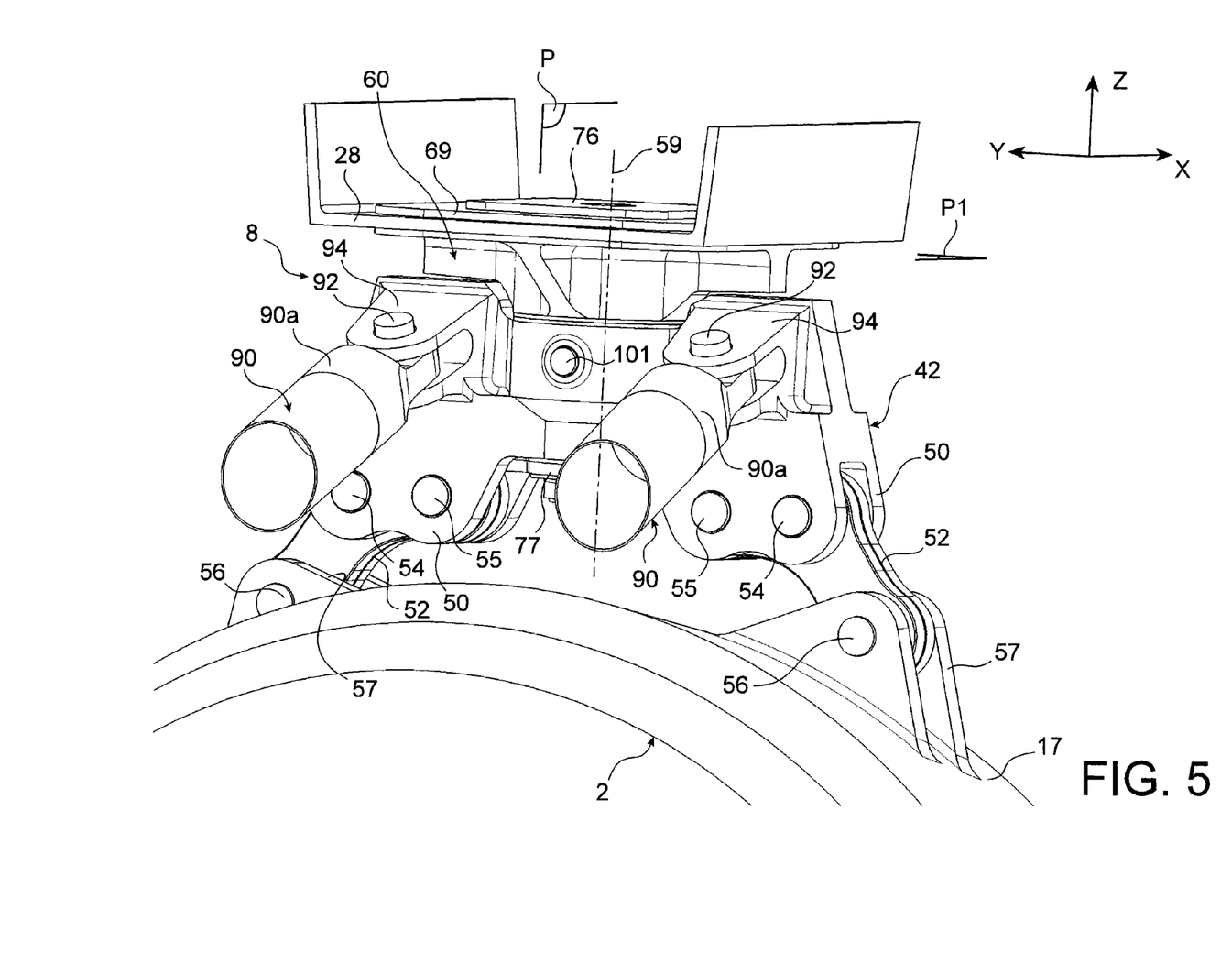
FIG. 5 represents a similar view to that of FIG. 2, with the rear part of the engine mounting system constructed according to another preferred embodiment of the present invention.
Figure 6:
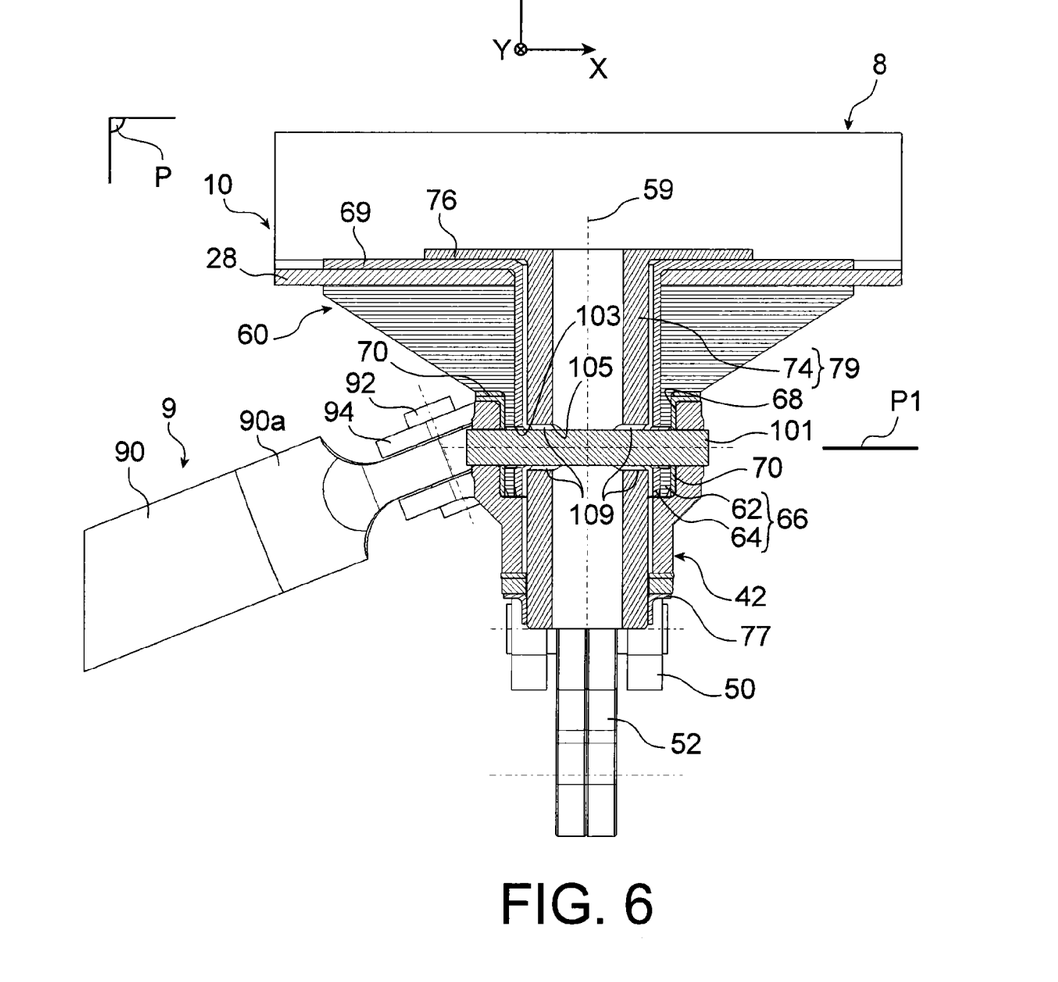
FIG. 6 represents a longitudinal section view passing through symmetry plane P of FIG. 5.
Figure 7:
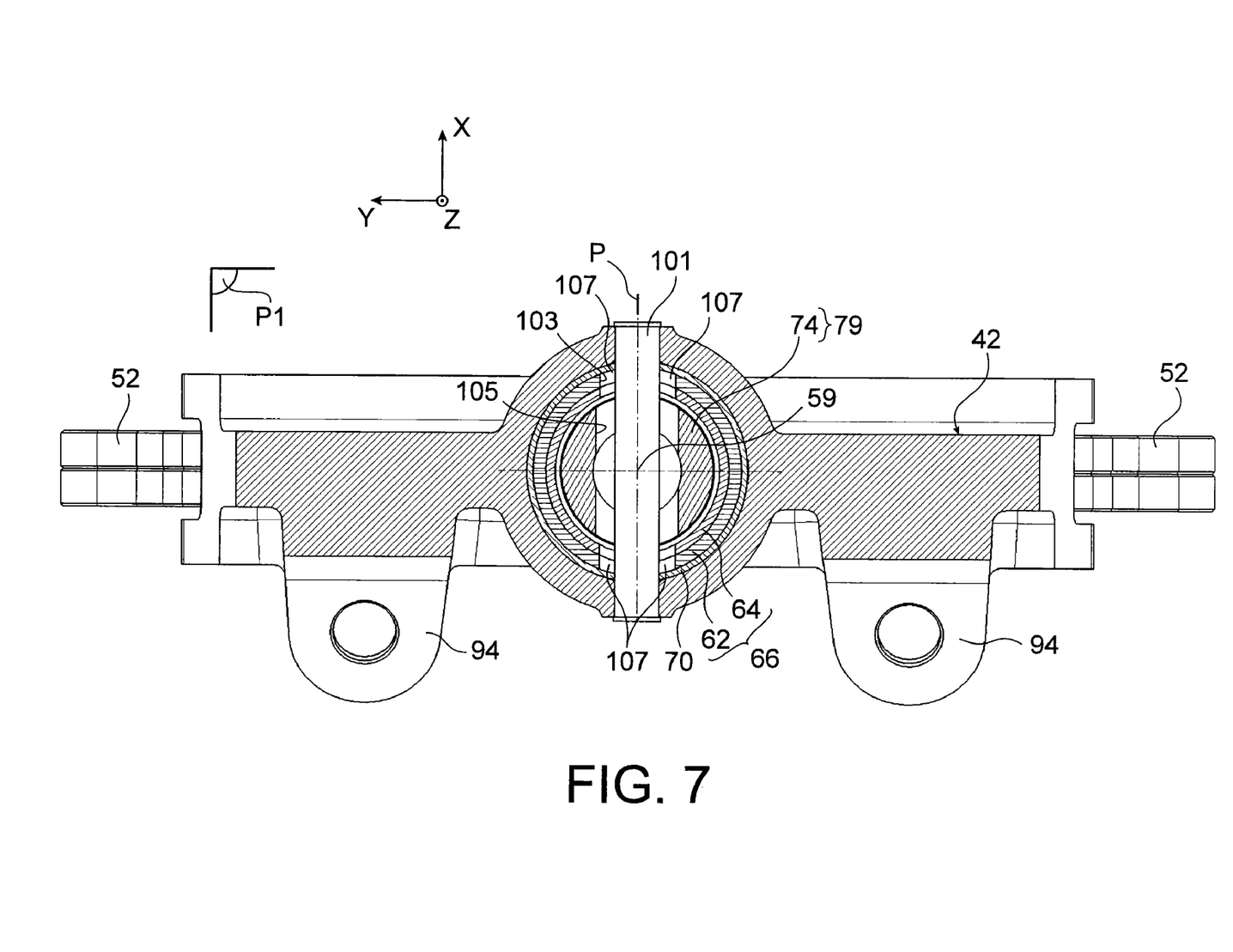
FIG. 7 represents a section view passing through horizontal plane P1 of FIGS. 5 and 6.

With reference now to FIGS. 5 and 7, it is possible to see the rear part of the engine mounting system, in another preferred embodiment of the present invention. It is of a roughly similar design to the one presented above, with the stipulation notably that in the figures the elements with the same numerical references correspond to identical or similar elements.

Thus, it is possible to see that the principal difference from the previous embodiment lies in the design of the stop devices, which are positioned such that they can stop, in both directions, the rotation of spreader beam 42 around its hinge line 59 defined by articulated shaft system 66.

Indeed, there are one or more stops 101, preferably taking the form of a pin aligned in direction X, and traversing either side attachment strut 42, passing through hinge line 59. Stop element 101 has a forward end secured on a front side of attachment strut 42, from which it makes a projection to the front, and a rear end secured on a rear side of attachment strut 42, from which it makes a projection to the rear.

Stop element 42, which is for example cylindrical and orthogonal with hinge line 59 which it intercepts, traverses with some play both brace system and articulated shaft system 66. To accomplish this, articulated shaft system 66 has a passage 103 diametrically traversing its two hollow shafts 62 and 64, a passage which thus has a diameter greater than that of pin 101. In identical fashion, brace system 79, which is here represented with a single brace 74, has a passage 105 diametrically traversing its brace 74, a passage which also has a diameter greater than that of pin 101, and preferably also greater than that of passage 103.

Thus, in normal operation pin 101 traverses passages 103 and 105 without being in contact with them, which firstly allows a circumferential play 107 to appear, relative to axis 59, between each end of pin 101 and passage 103. The two plays 107, which are diametrically opposed in articulated shaft system 66, are sufficiently great to allow the small rotations of spreader beam 42 during normal operation, during which the thrust connecting rods 90 are each subject to stress and non-failing.

Conversely, when a failure of the type indicated above occurs, spreader beam 42, which is then connected only by a single connecting rod 90, swivels in axis 59, driving pin 101, which follows the same movement, until this pin 101 comes into contact with passage 103, at both ends. The dual contact established following the consumption of both plays 107 then enables the stop devices to be activated, and causes the rotation of the spreader beam to stop, due to the permanent stoppage of the rotation of articulated shaft system 66 relative to the rigid structure of the engine mounting structure.

Here too, it must be understood that the positioning and dimensioning of the stop devices are chosen such that a maximum angle of rotation of this spreader beam around axis 59 is imposed; this maximum angle A, which is preferably identical for both directions of rotation, is naturally determined such that the thrust efforts transmission function can always be provided by transmission device 9, despite the connecting rod failure, at least during a determined period.

In addition, it is stipulated that the chosen design is such that the rotation of spreader beam 42 leads pin 101 to be brought into contact with passage 103 before this pin 101 comes into contact with the other passage 105, made in brace system 79. This enables the thrust efforts to be passed, in failure mode, through articulated shaft system 66, which is designed for this purpose, and not through brace system 79, which is designed essentially to suspend attachment strut 42.

With this regard, it should be noted that in normal operation pin 101 therefore traverses passages 103 and 105 without being in contact with them, which also reveals a play 109 in axis 59, between each end of pin 101 and passage 105. Thus, the efforts in direction Z parallel to axis 59 are transmitted through the stop of the lower end of brace 74 with nut 77, pin 101 then remains inoperative due to the presence of the two plays 109.

Conversely, when a failure of the stop link between the nut and brace 74 occurs, a relative displacement is observed in hinge line 59 between brace 74 and spreader beam 42, until pin 101 comes into contact with passage 105, at both ends. The dual contact established following the consumption of the two vertical plays 109 then enables a stop to be activated, and leads to a blockage of the translation of the spreader beam relative to brace 74. The activated stop then forms an integral part of the vertical efforts transmission path in failure mode.

Naturally, various modifications can be made by the skilled man in the art to engine mounting structure 4 of jet engine 2 for aircraft which has just been described, only as an non-restrictive example. With this regard, it is possible notably to indicate that if structure 4 has been presented in an appropriate configuration for it to be suspended under the wing surface of the aircraft, this structure 4 could also have a different configuration enabling it to be mounted above this same wing surface.

The invention claimed is:

1. An engine mounting structure for an engine aircraft, comprising:
    a rigid structure forming a caisson, together with an engine mounting system mounted on the rigid structure, and comprising a rear engine attachment, comprising an attachment strut to which is connected at least one shackle, to be connected to the engine;
    a system for transmitting thrust efforts generated by the engine, comprising two lateral connecting rods connected at their rear end to a spreader beam mounted in articulated fashion relative to the caisson,
    wherein the attachment strut of the rear engine attachment constitutes the spreader beam on to which the two lateral connecting rods are connected, the attachment strut is mounted in articulated fashion relative to the caisson using an articulated shaft system, the attachment strut is mounted in articulated fashion on to a support bracket mounted in fixed fashion on to the caisson, and the support bracket incorporates a slug belonging to the articulated shaft system, housed in a corresponding orifice of the attachment strut; and
    a brace system enabling the attachment strut to be retained relative to the support bracket in a direction of a hinge line of the spreader beam defined by the articulated shaft system, in which the brace system traverses each of the attachment strut and support bracket, and also the slug forming a hollow slug.

2. An engine mounting structure according to claim 1, wherein the attachment strut comprises two reception devices cooperating respectively with the two lateral connecting rods, wherein the two reception devices are positioned, as seen from the front, on either side of the articulated shaft system.

3. An engine mounting structure according to claim 2, wherein the two reception devices each take a form of a cap made from a single piece with the attachment strut.

4. An engine mounting structure according to claim 1, further comprising stop devices mounted on to the rigid structure forming a caisson and positioned so as to be able to stop, in both directions, rotation of the spreader beam around its hinge line defined by the articulated shaft system.

5. An engine mounting structure according to claim 4, wherein the support bracket comprises two lateral projections housed with some play respectively in two slots made in the attachment strut, wherein the slots and projections jointly form the stop devices.

6. An engine mounting structure according to claim 5, wherein the articulated shaft system is positioned substantially vertically.

7. An engine unit for an aircraft comprising an engine mounting structure according to claim 1, together with an engine mounted in fixed fashion on to the structure.

8. An aircraft including at least one engine unit according to claim 7.

* * * * *